(12) United States Patent
Imase et al.

(10) Patent No.: US 7,712,390 B2
(45) Date of Patent: May 11, 2010

(54) BALL TYPE SPEED REDUCER DEVICE

(75) Inventors: Kenji Imase, Aichi (JP); Akihito Terashima, Aichi (JP)

(73) Assignee: Kamoseiko Kabushiki Kaisha, Aichi (JP)

( * ) Notice: Subject to any disclaimer, the term of this patent is extended or adjusted under 35 U.S.C. 154(b) by 92 days.

(21) Appl. No.: 11/792,055

(22) PCT Filed: Jun. 6, 2006

(86) PCT No.: PCT/JP2006/311316

§ 371 (c)(1),
(2), (4) Date: Jun. 1, 2007

(87) PCT Pub. No.: WO2006/132239

PCT Pub. Date: Dec. 14, 2006

(65) Prior Publication Data

US 2008/0121060 A1    May 29, 2008

(30) Foreign Application Priority Data

Jun. 8, 2005     (JP)   ............................. 2005-168058

(51) Int. Cl.
*F16H 1/18*      (2006.01)
(52) U.S. Cl. .................. 74/424.81; 74/412 R
(58) Field of Classification Search ............... 74/425, 74/424.81, 412 R
See application file for complete search history.

(56) References Cited

U.S. PATENT DOCUMENTS

| | | | | |
|---|---|---|---|---|
| 3,365,974 A | * | 1/1968 | Lieberman | ................... 74/425 |
| 3,468,179 A | * | 9/1969 | Sedgwick et al. | ............. 74/425 |
| 5,237,886 A | * | 8/1993 | Kellar | .......................... 74/440 |
| 7,051,610 B2 | * | 5/2006 | Stoianovici et al. | ........... 74/425 |
| 2006/0156845 A1 | * | 7/2006 | Tong | ........................... 74/425 |
| 2008/0314179 A1 | * | 12/2008 | Bogar | ..................... 74/424.82 |

FOREIGN PATENT DOCUMENTS

| | | |
|---|---|---|
| JP | UM 46-23871 | 8/1971 |
| JP | UM 48-76372 | 9/1973 |
| JP | 54-22054 | 2/1979 |
| JP | 62-246644 | 10/1987 |
| JP | UM 62-194228 | 12/1987 |
| JP | 6-109081 | 4/1994 |
| JP | 11-108145 | 4/1999 |
| JP | 2000-042855 | 2/2000 |

* cited by examiner

*Primary Examiner*—David M Fenstermacher
(74) *Attorney, Agent, or Firm*—Morgan, Lewis & Bockius LLP

(57) ABSTRACT

Among six follower balls (5) aligned on the input shaft (7), the two balls (5) situated on one end side (A) always engage tightly with one engagement surface (10*a*), while the other two balls (5) situated on the other end side (B) always engage tightly with the other engagement surface (10*b*). This regulates the movement of the balls (5) against the engagement surface (10*a*, 10*b*) of the cammed streak portions (10) so as to eliminate a backlash played between the balls (5) and the cammed streak portions (10). This makes it possible to prevent the meshing noise from being induced so as to implement a low noise operation. With the point-to-point contact maintained between the cammed streak portions (10) and the balls (5), it is possible to reduce a friction therebetween, thereby improving a torque transmissibility against the follower wheel (4) to insure a smooth rotational movement with a higher precision.

2 Claims, 4 Drawing Sheets

BALL TYPE SPEED REDUCER DEVICE

FIELD OF THE INVENTION

The invention relates to a ball type speed reducer device in which an input shaft is arranged in an orthogonal relationship with an output shaft so as to transmit the rotational movement of the input shaft through a plurality of balls to a follower wheel which is provided at an output side.

BACKGROUND OF THE INVENTION

Speed reducer devices have been applied to robot techniques in which various component parts are transferred during manufacturing processes (e.g., producing digital versatile disks (DVD)). In the speed reducer devices, upon implementing the power transmission, an output shaft is reduced at its speed by driving the input shaft which is connected to a brachiate arm. The speed reducer device is known as a worm wheel device which has a transmission mechanism in which balls are provided between a worm screw and a wheel (referred to e.g., Japanese Laid-open Patent Application No. 6-109081). The worm screw has a series of helical grooves defined as thread helices, and the wheel has semi-circular cavities in which the respective rolling balls are provided.

The worm screw transmits its rotational movement to the wheel by way of the rolling balls, thereby avoiding a backlash played between the worm screw and the wheel so as to insure a low friction and high transmissibility therebetween.

In the worm wheel device disclosed by the Japanese Laid-open Patent Application No. 6-109081, the helical grooves of the worm screw represent the cammed grooves into which the semi-spherical portions of the respective balls are always fit in a surface-to-surface contact. Upon transmitting the rotational movement of the worm screw to the wheel while meshing the balls with the cammed grooves, the cammed grooves slide its concave surface along the spherical surface of the balls so as to implement a torque transmission between the worm screw and the wheel.

It is disadvantageous to slide the cammed grooves along the balls in the surface-to-surface contact from the point of inducing the friction between the cammed grooves and the balls. In order to implement a point-to-point contact instead of the surface-to-surface contact, it is necessary to provide the input shaft with streaks of cammed rib instead of the cammed grooves. In the ribbed cam structure in which the ribbed cam has a jutted portion, the cammed rib comes to engage with the balls to establish a pushable force in association with the rotational movement of the input shaft. This causes to induce a backlash played at an engagement surface between the cammed rib and the balls due to the mechanical reason.

Therefore, it is an object of the invention to overcome the above drawbacks, and provide a ball type speed reducer device which is capable of eliminating a backlash when the cammed rib structure is adopted to engage cammed ribs (jutted streaks) with balls in a point-to-point contact.

It is other object of the invention to provide a ball type speed reducer device which is capable of avoiding a meshing noise when engaging the cammed ribs with the balls so as to implement a low noise operation, while at the same time, improving a torque transmissibility against a follower wheel to insure a smooth rotational movement with a higher precision.

DISCLOSURE OF THE INVENTION

According to the invention, there is provided a ball type speed reducer device, a follower wheel is secured to an output shaft rotatably disposed within a housing. A plurality of follower balls are rotationally placed in cavities provided on an outer periphery of the follower wheel at regular intervals. An input shaft has a cammed streak portion, both sides of which have an engagement surface with which the follower balls come to engage, the input shaft being orthogonal with the output shaft. Among the follower balls, at least four balls are placed on the input shaft, the balls situated on the one end side of the input shaft and the balls situated on the other end side of the input shaft are placed in such a direction as to approach each other. The balls situated on one end side of the input shaft always engages tightly with one side of the engagement surface. The balls situated on the other end side of the input shaft always engages tightly with the other side of the engagement surface.

Such is the structure that the follower balls are restricted at their axial movement against the engagement surface of the cammed streak portion so as to eliminate a backlash played between the follower balls and the cammed streak portion when the cammed rib structure is adopted to engage the cammed streak portion with the follower balls in a point-to-point contact.

With the elimination of the backlash, it is possible to prevent the meshing noise from being induced so as to implement a low noise operation when engaging the cammed streak portion with the follower balls.

With the point-to-point contact between the cammed streak portion and the follower balls, it is possible to reduce a friction therebetween, thereby improving a torque transmissibility against the follower wheel to insure a smooth rotational movement with a higher precision.

In order to insure the above advantages, it is sufficient to always engage at least four balls tightly with the engagement surface of the cammed streak portion without adding any discrete components. This makes it possible to manufacture the ball type speed reducer device with a simplified structure at less cost.

According to other aspect of the invention, there is provided a ball type speed reducer device, a follower wheel is secured to an output shaft which is rotatably disposed within a housing. A plurality of follower balls are rotationally placed in cavities provided on an outer periphery of the follower wheel at regular intervals. An input shaft has a cammed streak portion, both sides of which have an engagement surface with which the follower balls come to engage, the input shaft being orthogonal with the output shaft. Among the follower balls, at least four balls are on the input shaft, one ball or balls situated on a middle portion of the input shaft are in non-contact with both sides of the engagement surface.

The balls situated on one end side of the input shaft and the balls situated on the other end side of the input shaft are placed in such a direction as to approach the ball or balls situated on the middle portion of the input shaft. The balls situated on the one end side of the input shaft always engages tightly with the one side of the engagement surface. The balls situated on the other end side of the input shaft always engages tightly with the other side of the engagement surface.

With the follower balls restricted its axial movement against the engagement surface of the cammed streak portion, it is possible to eliminate a backlash played between the follower balls and the cammed streak portion so as to insure the advantages mentioned above.

BRIEF DESCRIPTION OF THE DRAWINGS

Preferred forms of the present invention are illustrated in the accompanying drawings in which.

BEST MODE FOR CARRYING OUT THE INVENTION

Figure 1:
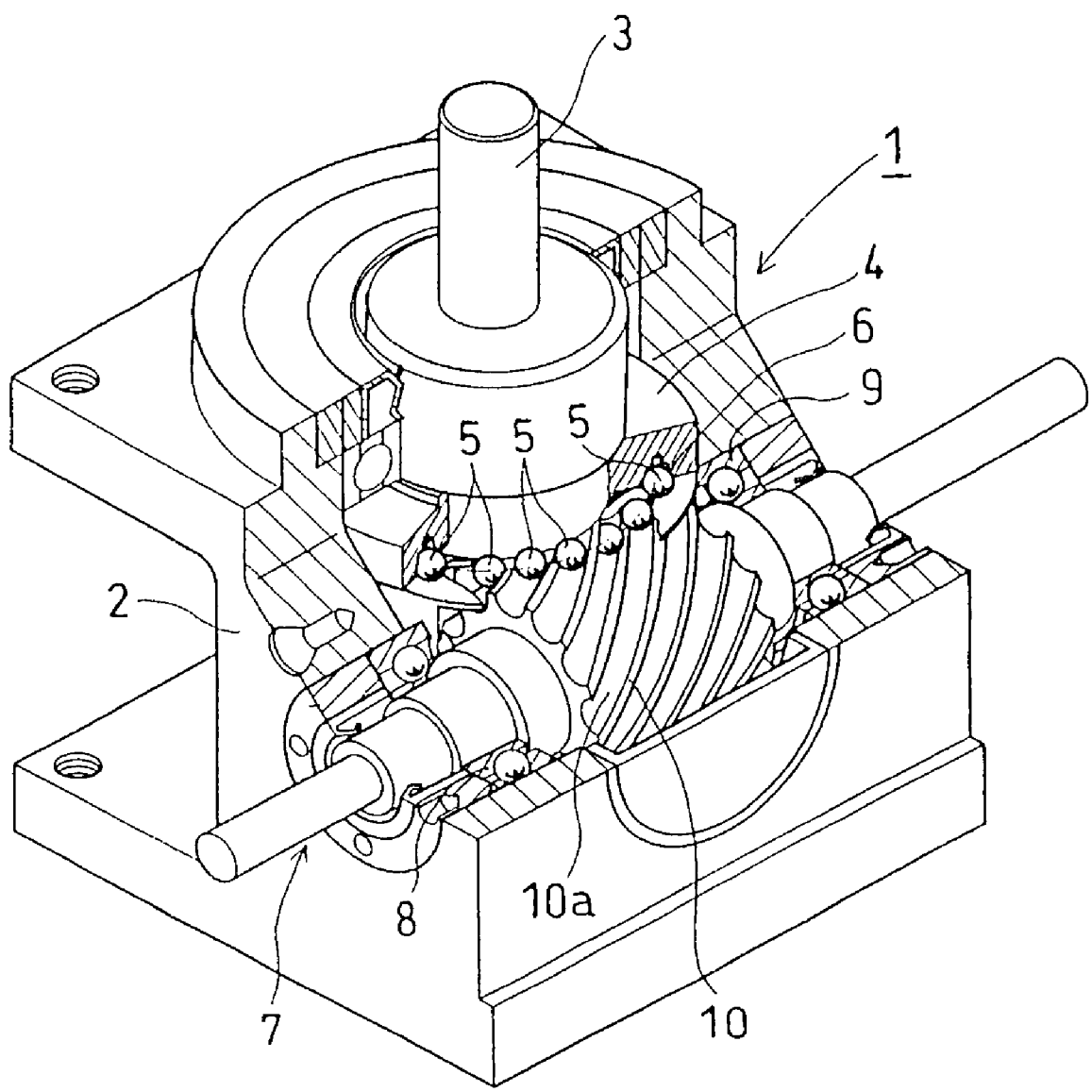
FIG. 1 is a perspective view of a ball type speed reducer device according to a first embodiment of the invention.

In a ball type speed reducer device in which the cammed rib structure is adopted to engage a cammed streak portion with follower balls in a point-to-point contact, the follower balls situated on one end side of the input shaft always engages tightly with one side of the engagement surface, and the balls situated on the other end side of the input shaft always engages tightly with the other side of the engagement surface with a backlash eliminated between the follower balls and the cammed streak portion. With the point-to-point contact between the cammed streak portion and the follower balls, it is possible to reduce a friction therebetween, thereby improving a torque transmissibility against the follower wheel to insure a smooth rotational movement with a higher precision.

DETAILED DESCRIPTION OF THE PREFERRED EMBODIMENTS OF THE INVENTION

First Embodiment of the Invention

In the following description of the depicted embodiments, the same reference numerals are used for features of the same type.

Referring to FIG. 1 which shows a ball type speed reducer device 1 according to a first embodiment of the invention, the ball type speed reducer device 1 is applied to robot techniques in which various component parts are transferred during manufacturing process (e.g., producing digital versatile disks (DVD)). The ball type speed reducer device 1 has a housing 2 in which a multi-stepped output shaft 3 is rotatably disposed vertically. To an outer surface of the output shaft 3, a follower wheel 4 is concentrically secured in a disc-shaped configuration. On a lower surface of an outer periphery of the follower wheel 4, a plurality of cavities 6 are provided in a circumferential direction at regular intervals. A cross section of the cavities 6 is a gothic arch by way of example. Instead of the gothic arch, the cavities 6 may be generally V-shaped, semi-spherical or horseshoe-shaped in cross section. Into the cavities 6, follower balls 5 are rotatably placed as steel metal balls.

An input shaft 7, which is driven by a driving source (not shown), is disposed in an orthogonal relationship with the output shaft 3, and rotatably supported by roller bearings 8, 9. The input shaft 7 has a plurality of cammed streak portions 10 to serve as threaded helices, both inner sides of which define engagement surfaces 10a, 10b to form a cammed rib structure.

Figure 2:
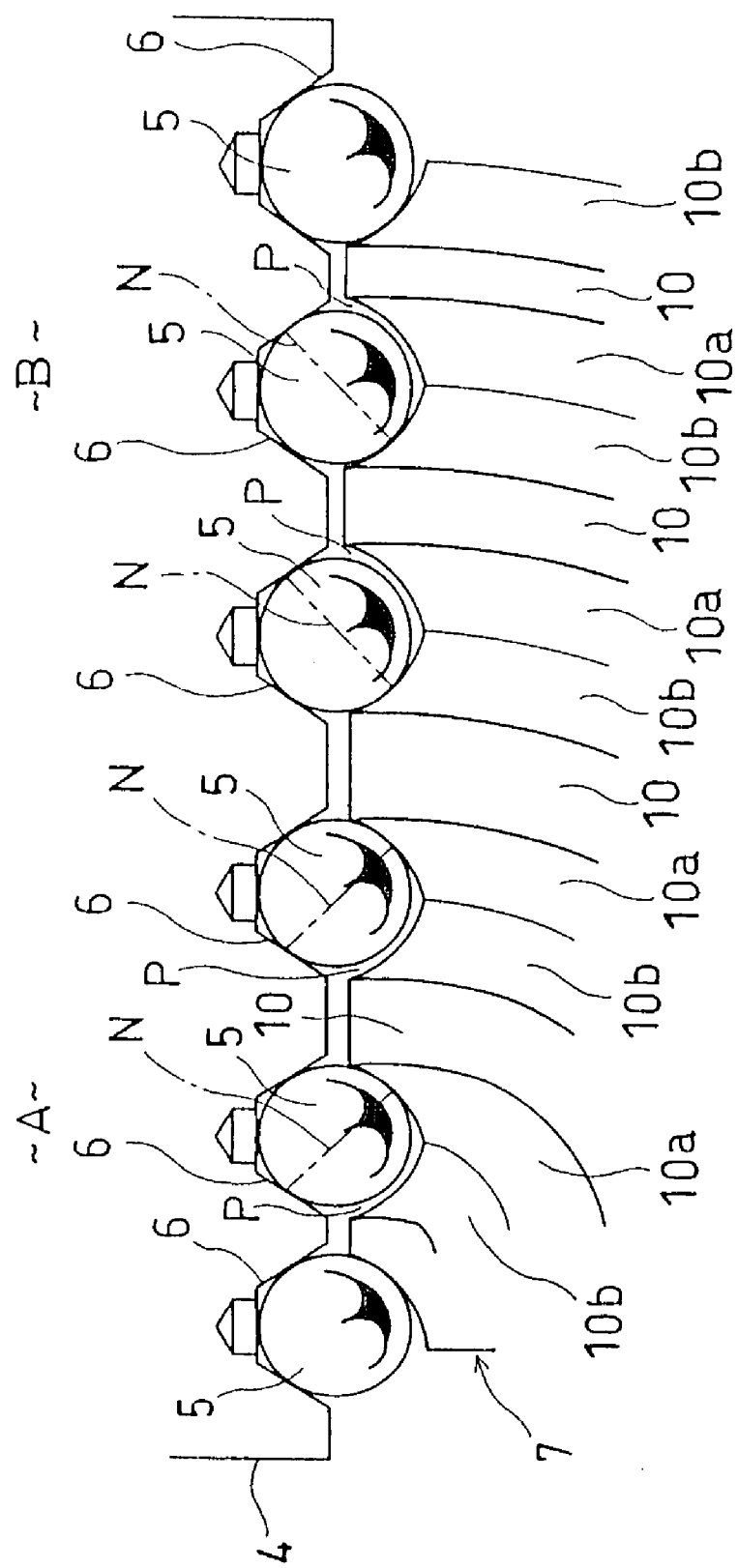
FIG. 2 is an enlarged longitudinal cross sectional view of an engagement surface between a cammed streak portion and follower balls.

Among the six follower balls 5 aligned on the input shaft 7, the two balls 5 situated on one end side (A) always engage tightly with one engagement surface 10a in a point-to-point contact as shown in FIG. 2. The other two balls 5 situated on the other end side (B) always engage tightly with the other engagement surface 10b in a point-to-point contact.

In this instance, the two balls 5 situated on one end side (A) and the other two balls 5 situated on the other end side (B) are placed in such a direction as to approach each other. Conversely, the two balls 5 situated on one end side (A) face the opposite engagement surface 10b with a clearance (P) therebetween, and the two balls 5 situated on the other end side (B) face the opposite engagement surface 10a with a clearance (P) therebetween.

It is to be noted that among the six follower balls 5 aligned on the input shaft 7, the two balls 5 situated on one end side (A) may always engage tightly with one engagement surface 10b in a point-to-point contact, and the other two balls 5 situated on the other end side (B) may always engage tightly with the other engagement surface 10a in a point-to-point contact.

With the structure thus described, when the input shaft 7 is rotationally driven by the driving source, the follower balls 5 roll along the engagement surface 10a (10b) to transmit a pushable force to the follower wheel 4 as shown at dot-dash lines (N) in FIG. 2. The pushable force thus transmitted, drives the output shaft 3 rotationally in unison with the follower wheel 4. Each time when the input shaft 7 rotates once, the output shaft 3 is rotationally driven by a single pitch of the cammed streak portions 10 to constitute a speed reducing mechanism.

Such is the structure that the follower balls 5 are restricted at their axial movement against the engagement surface 10a (10b) of the cammed streak portions 10 so as to eliminate a backlash played between the follower balls 5 and the cammed streak portion 10 when the cammed rib structure is adopted to engage the cammed streak portions 10 with the follower balls 5 in a point-to-point contact.

With the elimination of the backlash, it is possible to prevent the meshing noise from being induced so as to implement a low noise operation when engaging the cammed streak portions 10 with the follower balls 5.

With the point-to-point contact maintained between the cammed streak portions 10 and the follower balls 5, it is possible to reduce a friction therebetween, thereby improving a torque transmissibility against the follower wheel 4 to insure a smooth rotational movement with a higher precision.

In order to insure the above advantages, it is sufficient to always engage at least four balls tightly with the engagement surface 10a (10b) without adding any discrete components. This makes it possible to manufacture the ball type speed reducer device 1 at less cost with a simplified structure.

Second Embodiment of the Invention

Figure 3:
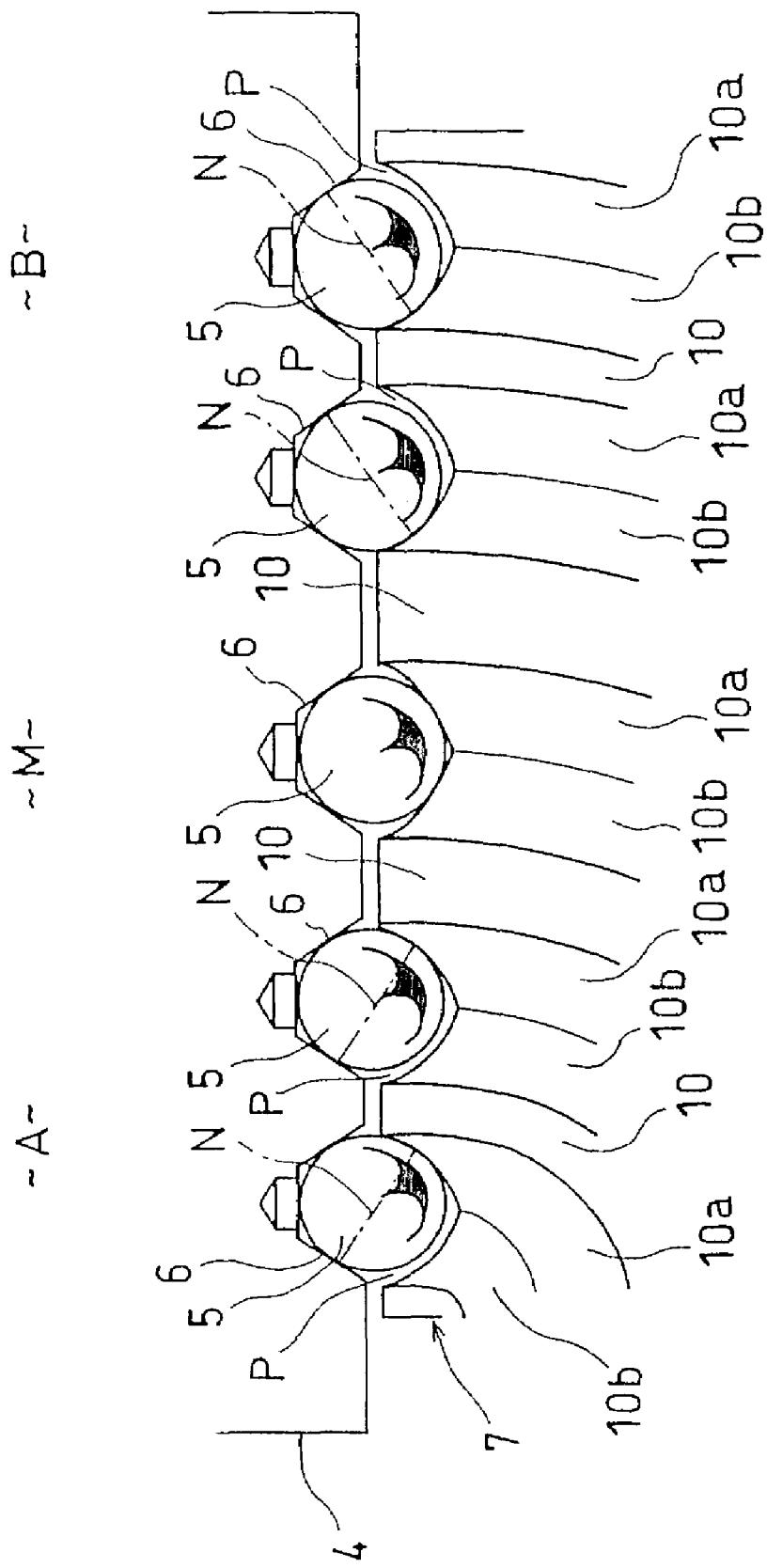
FIG. 3 is an enlarged longitudinal cross sectional view of an engagement surface between a cammed streak portion and follower balls according to a second embodiment of the invention.
Figure 4:
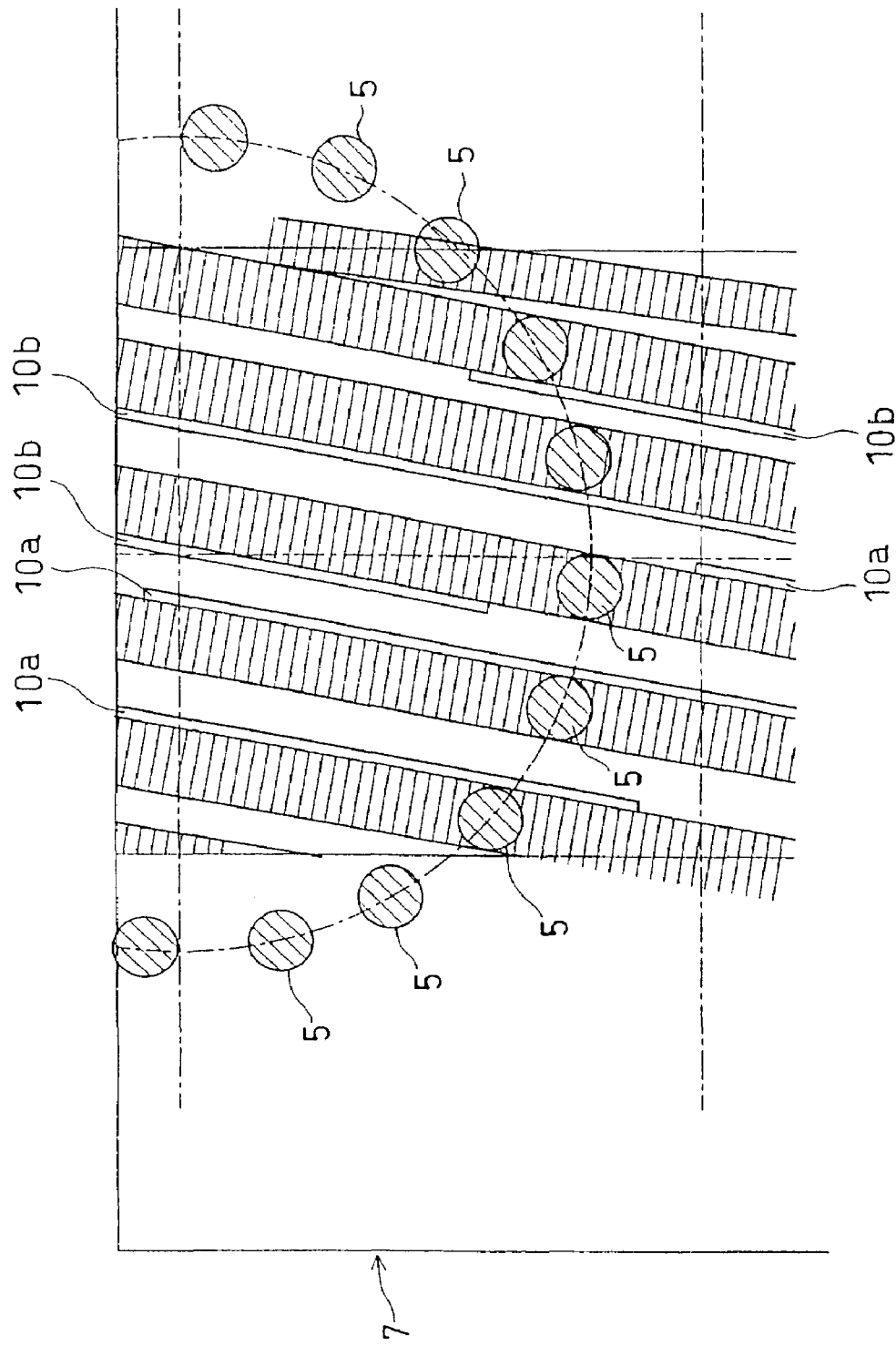
FIG. 4 is a schematic development showing how the follower balls engage with the engagement surface when the balls move beyond a middle portion of the cammed streak portion.

FIGS. 3 and 4 show a second embodiment of the invention in which the ball 5 is situated on a middle portion (M) of the cammed streak portions 10 of the input shaft 7. The ball 5 situated on the middle portion (M) is in a non-contact and non-torque transmissible relationship (no torque-transmissibility) with both of the engagement surfaces 10a, 10b of the cammed streak portion 10.

Among the five balls 5, the two balls 5 situated on the one end side (A) of the input shaft 7 always engage tightly with the one side of the engagement surface 10a. The rest balls 5 situated on the other end side (B) of the input shaft 7 always engage tightly with the other side of the engagement surface 10b.

In this instance, the balls 5 situated on the one end side (A) and the balls 5 situated on the other end side (B) are placed in such a direction as to approach the ball 5 situated on the middle portion (M) of the input shaft 7.

It is to be noted that the two balls 5 situated on the one end side (A) of the input shaft 7 may always engage tightly with the other engagement surface 10b, and the rest balls 5 situated on the other end side (B) of the input shaft 7 may always engage tightly with the one engagement surface 10a.

Each time when the balls 5 situated on the one end side (A) move beyond the middle portion (M) to the other end side (B) in accompany with the rotational movement of the input shaft 7, the ball 5 changes its rolling side against the engagement surface 10a (10b) as shown in FIG. 4.

During the passage in which the ball 5 moves beyond the middle portion (M), no meshing noise is induced because the ball 5 is in the non-contact and non-torque transmitting relationship with both of the engagement surfaces 10a, 10b.

As apparent from the foregoing description, the two balls 5 situated on one end side (A) always engage tightly with one side of the engagement surface 10a, and the rest balls 5 situated on the other end side (B) always engage tightly with the other side of the engagement surface 10b.

This restricts the follower balls 5 at their axial movement against the engagement surface 10a (10b), it is possible to eliminate a backlash played between the follower balls 5 and the cammed streak portion 10 so as to insure the same advantages as mentioned at the first embodiment of the invention.

It is to be appreciated that the number of the follower balls 5 is not confined to six or five as long as four or more balls 5 are placed to engage with one of the engagement surfaces 10a, 10b of the cammed streak portion 10.

It is to be noted that instead of one ball 5, two or more balls may be placed on the middle portion (M) of the cammed streak portion 10.

INDUSTRIAL APPLICABILITY

The follower balls are restricted at their axial movement against the engagement surface of the cammed streak portion so as to eliminate a backlash when the cammed rib structure is adopted to engage the cammed streak portion with the follower balls in a point-to-point contact. This makes it possible to reduce a friction therebetween, thereby improving a torque transmissibility against the follower wheel to insure a smooth rotational movement with a high precision. This arises a demand from a sector which seeks a cost-saving device with a higher performance but a simplified structure, thereby contributing to the mechanical industries through the distribution of component parts.

What is claimed is:

1. A ball type speed reducer device comprising:
a follower wheel secured to an output shaft which is rotatably disposed within a housing;
a plurality of follower balls rotationally placed in cavities which are provided on an outer periphery of said follower wheel at regular intervals in a circumferential direction;
an input shaft having a cammed streak portion, both sides of which have a first engagement surface and a second engagement surface with which said follower balls come to engage, said input shaft being orthogonal with said output shaft;
among said follower balls, at least four balls being on said input shaft, a first part of said balls situated on a first end side of said input shaft and a second part of said balls situated on a second end side of said input shaft being placed in such a direction as to approach each other;
the first part of said balls situated on said first end side of said input shaft always engaging tightly with the first engagement surface; and
the second part of said balls situated on said second end side of said input shaft always engaging tightly with the second engagement surface.

2. A ball type speed reducer device comprising:
a follower wheel secured to an output shaft which is rotatably disposed within a housing;
a plurality of follower balls rotationally placed in cavities which are provided on an outer periphery of said follower wheel at regular intervals in a circumferential direction;
an input shaft having a cammed streak portion, both sides of which have a first engagement surface and a second engagement surface with which said follower balls come to engage, said input shaft being orthogonal with said output shaft;
among said follower balls, at least four balls being on said input shaft;
a first part of said balls situated on a first end side of said input shaft and a second part of said balls situated on a second end side of said input shaft being placed in such a direction as to approach a third part of said balls situated on a middle portion of said input shaft being in non-contact with the first engagement surface and the second engagement surface;
the first part of said balls situated on said first end side of said input shaft always engaging tightly with the first engagement surface; and
the second part of said balls situated on said second end side of said input shaft always engaging tightly with the second engagement surface.

* * * * *